United States Patent

Corbett et al.

[11] Patent Number: 6,018,206
[45] Date of Patent: Jan. 25, 2000

[54] METHOD AND DEVICE FOR INHIBITING OIL LEAKAGE FROM AN ELECTRIC MOTOR

[75] Inventors: Ann L. Corbett, St. Louis, Mo.; Donald L. Huckabay, Rector, Ark.

[73] Assignee: Emerson Electric Co., St. Louis, Mo.

[21] Appl. No.: 09/212,126

[22] Filed: Dec. 15, 1998

Related U.S. Application Data

[62] Division of application No. 08/843,227, Apr. 14, 1997.

[51] Int. Cl.$^7$ .................................................. H02K 5/00
[52] U.S. Cl. ............................... 310/91; 310/89; 310/45
[58] Field of Search .................................. 310/88, 89, 91, 310/45, 40 MM, 42; 29/596, 598

[56] References Cited

U.S. PATENT DOCUMENTS

| | | | |
|---|---|---|---|
| 2,984,528 | 5/1961 | Shaffer | 310/108 |
| 3,331,638 | 7/1967 | Fruth | 310/108 |
| 3,455,615 | 7/1969 | Stella | 384/192 |
| 3,573,510 | 4/1971 | Oto | 308/132 |
| 3,704,923 | 12/1972 | Rajna | 308/132 |
| 4,800,309 | 1/1989 | Lakin | 310/90 |
| 4,910,424 | 3/1990 | Borcherding | 310/90 |
| 5,250,862 | 10/1993 | Uzawa | 310/40 MM |
| 5,360,274 | 11/1994 | Strobl | 384/192 |
| 5,475,275 | 12/1995 | Dohogne et al. | 310/89 |

*Primary Examiner*—Nestor Ramirez
*Assistant Examiner*—Tran Nguyen
*Attorney, Agent, or Firm*—Howell & Haferkamp, L.C.

[57] ABSTRACT

An improved bearing cap comprises a cap surface having an inner rim, an outer rim, and one or more protuberances extending upwardly from the cap surface a distance greater than the inner rim. Four protuberances are preferably spaced ninety degrees apart from one another and are positioned radially outward from the annular inner rim of the bearing cap. An improved electric motor comprises a motor shaft, a housing having an inner rim defining an opening through which the motor shaft extends, and a washer circumscribing the motor shaft on an interior side of the housing, where the housing is configured to prevent the washer from moving into contact with the inner rim when the motor shaft is rotating. The housing preferably has a component construction to facilitate its assembly, and comprises the improved bearing cap which itself includes the inner rim.

20 Claims, 3 Drawing Sheets

METHOD AND DEVICE FOR INHIBITING OIL LEAKAGE FROM AN ELECTRIC MOTOR

This is a divisional application of copending application Ser. No. 08/843,227, filed on Apr. 14, 1997 and presently pending.

BACKGROUND OF THE INVENTION (1) Field of the Invention

The present invention relates to a method and device for inhibiting oil leakage from an electric motor and, more particularly, to a bearing cap having one or more protuberances thereon dimensioned to prevent a motor shaft washer from moving into contact with an inner rim of the bearing cap, and to an electric motor embodying such a bearing cap.

(2) Description of the Related Art

A conventional electric motor configured for a shaft-down application (i.e., where the motor shaft extends vertically downward through the motor housing) is shown generally in FIG. 1, and includes an end shield A, a motor shaft B, a rubber washer C, a bearing cap D, and an oil wick E. The bearing cap, which together with the end shield forms a portion of the motor housing, includes an opening F through which the motor shaft can extend, and holds the rubber washer within the electric motor when the motor is fully assembled. One primary function of the bearing cap is to catch oil that travels through openings G formed in the end shield, as well as to catch any oil that travels down through the end shield between the motor shaft and an end shield hub H. The oil wick is provided for drawing oil contained in the bearing cap back to an opposite side of the end shield. FIG. 1 also illustrates several centering tabs I formed on the end shield for maintaining the rubber washer in alignment with the motor shaft during assembly of the electric motor.

When the electric motor is fully assembled as shown in FIG. 2, the rubber washer extends around the motor shaft and maintains positive clearance with both an inner rim J of the bearing cap and the end shield hub. Thus, the rubber washer rotates freely with the motor shaft and holds tight thereto for preventing oil from running down the motor shaft and through the bearing cap opening. During the assembly process, the rubber washer is positioned as shown in FIG. 2 using a positioning tool that can slide between the motor shaft and the inner rim of the bearing cap so as to push the washer away from the inner rim. For this reason, the diameter of the bearing cap opening must be large enough to allow not just the motor shaft to extend therethrough, but the positioning tool as well.

The prior art electric motor is disadvantaged in several significant respects, including the tendency of the motor to leak oil when in service. Over time, the rubber washer can move downwardly along the length of the motor shaft and ultimately contact the inner rim of the bearing cap. Thereafter, rotation of the motor shaft induces a pumping action between the bottom side of the rubber washer and the top edge of the inner rim, and pumps oil contained within the bearing cap over the top edge of the inner rim. Once the oil is lifted over the inner rim, it is free to run down the motor shaft, through the bearing cap opening, and out of the electric motor. As is well-known in the art, the loss of oil from an electric motor increases the temperature of the motor bearings and ultimately results in premature motor failure.

When an electric motor of the type described above is configured for a shaft-across application (i.e., where the motor shaft extends horizontally through the motor housing), the washer shown in FIGS. 1 and 2 is not used and, thus, the positioning tool is unnecessary. The added space between the inner rim of the bearing cap and the motor shaft, which was provided for insertion of the positioning tool, is also unnecessary. In fact, for shaft-across motor applications, this added space leaves the electric motor overly exposed to contaminates and moisture that can contaminate the oil and/or induce corrosion, thereby reducing the useable life of the electric motor. Moreover, typical shaft-across electric motors employ a necked-down motor shaft (i.e., a motor shaft having a reduced diameter in the vicinity of the bearing cap opening) to facilitate the assembly process. Such a necked-down motor shaft further increases the spacing between the inner rim of the bearing cap and the motor shaft and, hence, further exposes the electric motor to contaminants and moisture. For all of these reasons, the bearing cap used for shaft-across applications must have a smaller opening than that of the bearing cap used for shaft-down applications.

As explained above, two different types of bearing caps must be manufactured and stocked, where the type of bearing cap used with a given electric motor depends upon whether the motor will be configured for a shaft-down or shaft-across application. The requirement for two different bearing caps increases inventory and handling costs, and also introduces a risk of using the wrong type of bearing cap in a particular assembly, thereby causing quality control problems.

What is needed is a method and device for preventing the rubber washer used in shaft-down motor applications from moving into contact with the inner rim of the bearing cap so as to eliminate the pumping action that can otherwise be induced when the motor shaft is rotating. Such a method and device would preferably eliminate the need for two different types of bearing caps having different sized openings so that a single bearing cap can be used in both shaft-down and shaft-across motor applications. Providing a single type of bearing cap for use in either application would reduce inventory, handling, and other manufacturing costs, and would eliminate the risk of using the wrong type of bearing cap in a particular motor assembly.

SUMMARY OF THE INVENTION

The inventors hereof have succeeded at solving these and other needs in the art by designing and developing a method and device for preventing the washer used in shaft-down motor applications from moving into contact with the inner rim of the bearing cap when the motor shaft is rotating. As a result, the oil pumping action that can be induced by such contact is prevented, thereby inhibiting oil leakage from the electric motor and increasing the useful life thereof. The inventors' preferred approach to preventing the washer from contacting the inner rim is by forming one or more protuberances on the bearing cap, where each protuberance extends upwardly into the electric motor a distance greater than the inner rim. Thus, even if the washer works its way down the motor shaft over time, the protuberance will ultimately act as a stop surface that prevents any further downward movement. In this manner, the bearing cap protuberance can prevent the washer from moving downwardly along the motor shaft a distance sufficient to come into contact with the bearing cap's inner rim.

The preferred bearing cap also eliminates any need for the positioning tool formerly required to ensure positive clearance between the washer and the inner rim of the bearing cap during the assembly process. There is therefore no longer any need for the bearing cap used in shaft-down applications to have an opening larger than the bearing cap used in shaft-across applications. The preferred bearing cap of the present invention can instead be used in both applications and thus, in addition to inhibiting oil leakage as discussed above, results in a consolidation of parts, a decrease in manufacturing costs, and an increase in quality control.

In the inventors' preferred embodiment, four protuberances are spaced ninety degrees apart from one another on the bearing cap, and are positioned radially outward from the annular inner rim. Due to this positioning, even if the washer moves into contact with the top sides of the protuberances and induces an oil pumping action, any oil that is lifted over a protuberance is still contained within the bearing cap reservoir formed between the inner and outer rims. Each protuberance is preferably formed integrally with the bearing cap from a single piece of material, and has a generally triangular cross section.

An electric motor according to the present invention comprises a motor shaft, a housing having an inner rim that defines an opening through which the motor shaft extends, and a washer extending around the motor shaft on an interior side of the housing, where the housing is configured to prevent the washer from moving into contact with the inner rim when the motor shaft is rotating. In the preferred embodiment, the housing has a component construction and includes an end shield and the inventors' preferred bearing cap described above. In addition, the electric motor includes an oil wick and the end shield includes a plurality of centering tabs, where the oil wick and the centering tabs are all positioned and dimensioned to maintain positive clearance with the protuberances on the bearing cap. A method for inhibiting oil leakage from an electric motor according to the present invention comprises the step of preventing the washer used in shaft-down applications from moving into contact with the bearing cap's inner rim when the motor shaft is rotating. The preferred approach to carrying out the preventing step is by forming protuberances on the bearing cap in the manner described above.

While the principal features and advantages of the present invention have been described above, a more complete and thorough understanding of the present invention can be attained by referring to the drawings and the detailed description of the preferred embodiments which follow.

DETAILED DESCRIPTION OF THE PREFERRED EMBODIMENTS

Figure 3:
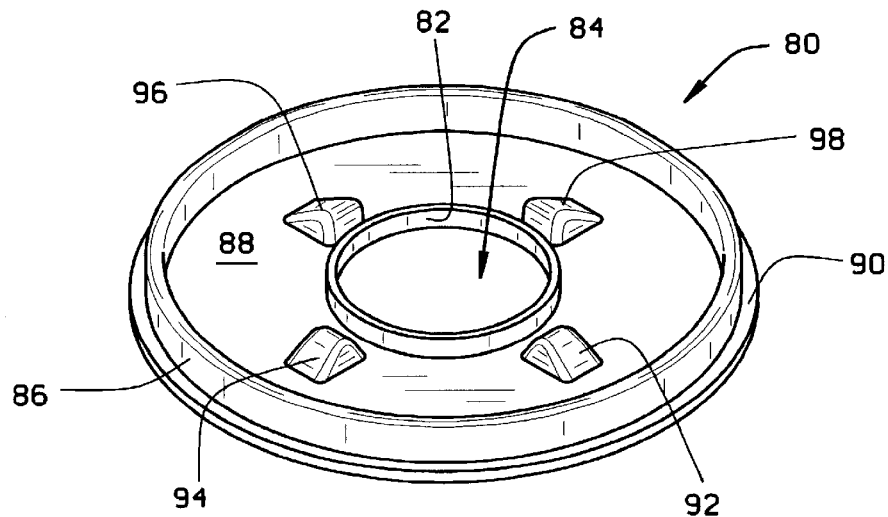
FIG. 3 is an isometric view of an improved bearing cap according to the present invention.
Figure 4:
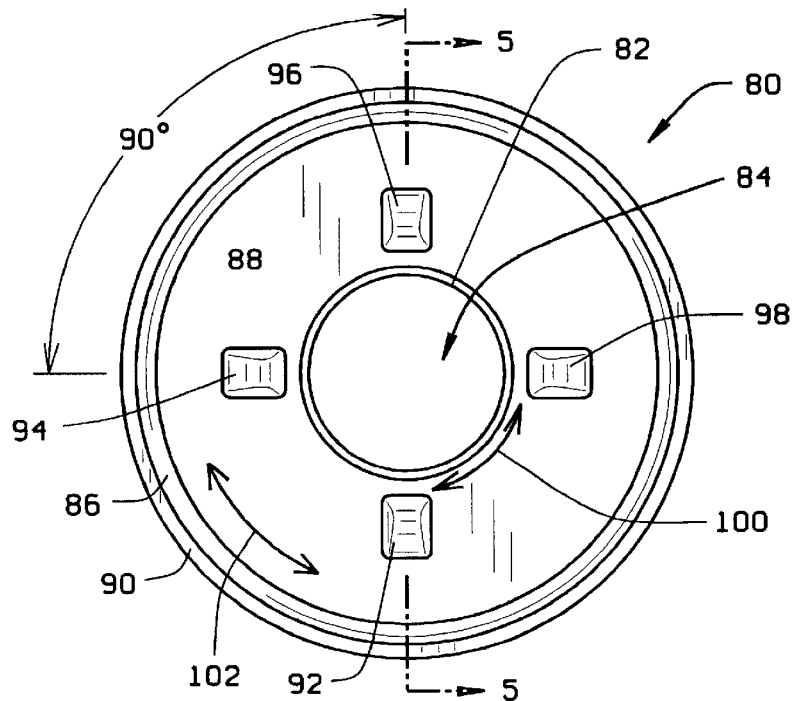
FIG. 4 is a plan view of the bearing cap of FIG. 3.

An improved bearing cap for an electric motor in accordance with the present invention is shown in FIG. 3, and is designated generally by the reference character 80. The bearing cap 80 includes an annular inner rim 82 circumscribing and defining an opening 84, an outer rim 86, and a cap surface 88 extending fully between the inner rim 82 and the outer rim 86. An outer lip 90 circumscribes the outer rim 86. The cap surface 86 has several protuberances 92, 94, 96, 98 extending upwardly therefrom and positioned radially outward from the annular inner rim 82. Although four protuberances are provided on the cap surface 88 in the inventors' preferred embodiment, it should be understood that more and as few as one protuberance can be effectively employed, as explained further below. As best shown in FIG. 4, the protuberances 92–98 are spaced ninety degrees apart from one another, and are positioned between the inner rim 82 and the outer rim 86. An inner portion 100 of the cap surface 88 extends around the inner rim 82 radially inward from the protuberances 92–98, and an outer portion 102 of the cap surface extends adjacent to the outer rim 86 and radially outward from the protuberances 92–98. In the preferred embodiment, the protuberances 92–98 are integrally formed with the bearing cap 80 from a single piece of material which preferably comprises steel.

Figure 5:
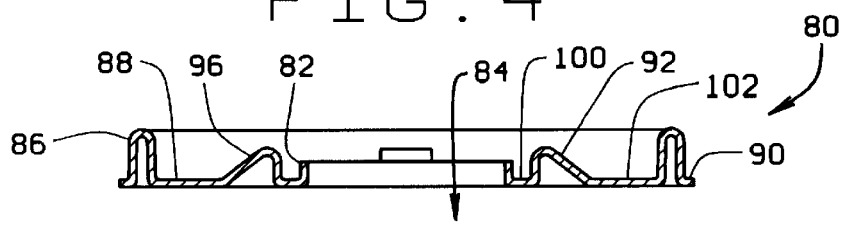
FIG. 5 is a cross-sectional elevation view taken along line 5—5 of FIG. 4.

FIG. 5 illustrates the protuberances 92, 96 as having a generally triangular cross-sectional shape, and as extending upwardly from the cap surface 88 a distance greater than does the inner rim 82. Although not shown in FIG. 5, the protuberances 94, 98 extend above the inner rim 82 in like fashion, and preferably have a size and shape identical to the protuberances 92, 96. Similar to the prior art bearing cap, the outer rim 86 is configured to be press-fit into an opening in a motor end shield with the outer lip 90 preventing overinsertion. The outer rim 86 extends upwardly from the cap surface 88 a distance greater than does the inner rim 82 and the protuberances 92–98. The inner rim 82, the outer rim 86, and the cap surface 88 together define a reservoir for containing oil when the bearing cap is installed on an electric motor, as explained further below.

Figure 6:
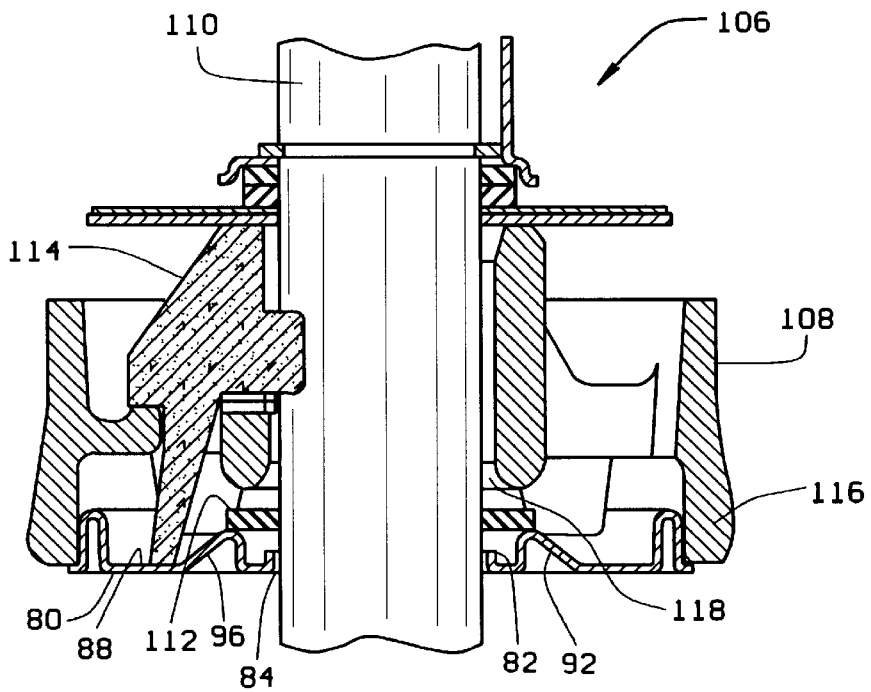
FIG. 6 is a cross-sectional elevation view taken through the oil wick of an electric motor according to the present invention.

FIG. 6 illustrates the output shaft end of an electric motor 106 constructed according to the present invention, which includes a motor housing 108, a motor shaft 110, a rubber washer 112, and a felt oil wick 114. The motor housing 108 preferably has a component (i.e., multi-part) construction so as to facilitate assembly of the electric motor, and includes an end shield 116 and the improved bearing cap 80, which was described above, press-fit into an opening in the end shield 116. Alternatively, the housing 108 can be integrally formed (at least on the end through which the motor shaft extends) with the advantageous features of the bearing cap 80 integrated therein.

The rubber washer 112 ideally maintains positive clearance with a hub 118 of the end shield 116 and the bearing cap protuberances 92–98. Over time, however, the rubber washer 112 may work its way downwardly along the motor shaft 110. When this occurs, the rubber washer 112 will ultimately contact the protuberances 92–98, as shown in FIG. 6, such that the protuberances will act as a stop surface and will prevent the rubber washer 112 from moving into contact with the bearing cap's inner rim 82. In this manner, the protuberances 92–98 prevent the oil pumping action that could otherwise be induced, where oil would be lifted over the inner rim 82 and then run down the motor shaft 110 and through the bearing cap opening 84.

Furthermore, when the motor shaft 110 begins rotating, frictional forces between the rubber washer 112 and the protuberances 92–98 cause the rubber washer 112 to pull away from the protuberances and rotate freely with the motor shaft 110. For this reason, less than four and as few as one protuberance can be provided on the bearing cap 80 to reap the advantages of the present invention. Nevertheless, the inventors have determined that by using four protuberances 92–98 having a ninety degrees spacing, the rubber washer 112 is always maintained in a generally horizontal position, thereby increasing the tendency of the rubber washer to pull away from the protuberances when the motor shaft is rotating. Maintaining the rubber washer in a generally horizontal position also minimizes forces applied to the washer by the protuberances so as to increase the washer's longevity.

In view of the above description, it should be clear that the positioning tool of the prior art, which was used to ensure positive clearance between the rubber washer and the inner rim of the bearing cap, is rendered obsolete when the teachings of the present invention are implemented. Even if the rubber washer 112 is placed on the motor shaft 110 in the area to be occupied by the inner rim 82 of the bearing cap 80 while the electric motor 106 is being assembled, installation of the bearing cap will cause the bearing cap protuberances 92–98 to push the rubber washer further up the motor shaft. Thus, the protuberances 92–98 provided by the present invention also serve as a positioning tool during the assembly process, and ensure positive clearance between the rubber washer 112 and the bearing cap's inner rim 82. Because the prior art positioning tool is no longer needed, the diameter of the bearing cap opening 84 is reduced as compared to that of the prior art bearing cap, thereby rendering the bearing cap 80 suitable for use in both shaft-down and shaft-across applications.

It should be understood from FIG. 6 that because the protuberances 92–98 are positioned radially outward from the inner rim 82, the bearing cap 80 will inhibit any tendency for oil to leak from the electric motor, even where contact between the rubber washer 112 and the protuberances 92–98 induces a pumping action. In other words, even if the top sides of the protuberances are wet with oil, and the rubber washer 112 contacts the protuberances and induces a pumping action when the motor shaft 110 is rotating, the oil contained by the bearing cap will, at most, be moved from the outer portion 102 of the cap surface 88 to the inner portion 100, but will still be maintained within the bearing cap reservoir formed by the inner rim 82, the outer rim 86, and the cap surface 88. Alternatively, the protuberances could be positioned along the inner rim 82 and extend upwardly therefrom, but this could result in minimal oil leakage if the top sides of the protuberances are wet with oil and are contacted by the rubber washer 112.

Figure 1:
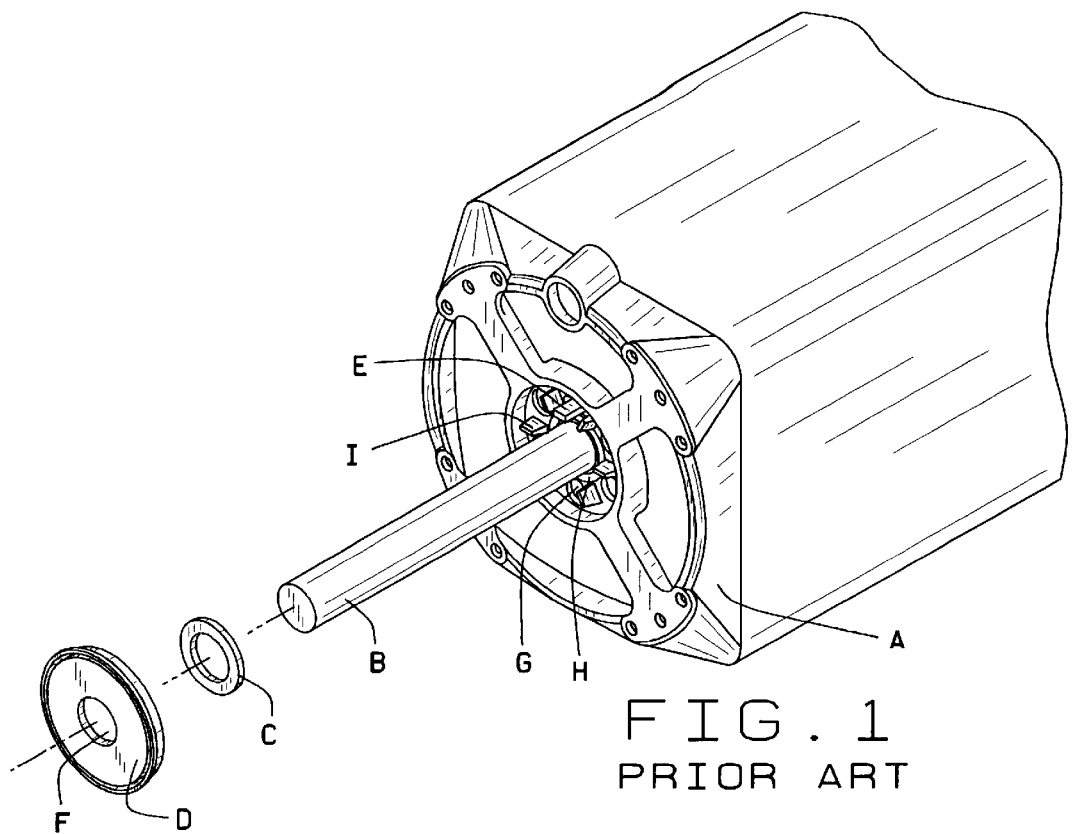
FIG. 1 is an exploded isometric view of an electric motor configured for a shaft-down application.
Figure 2:
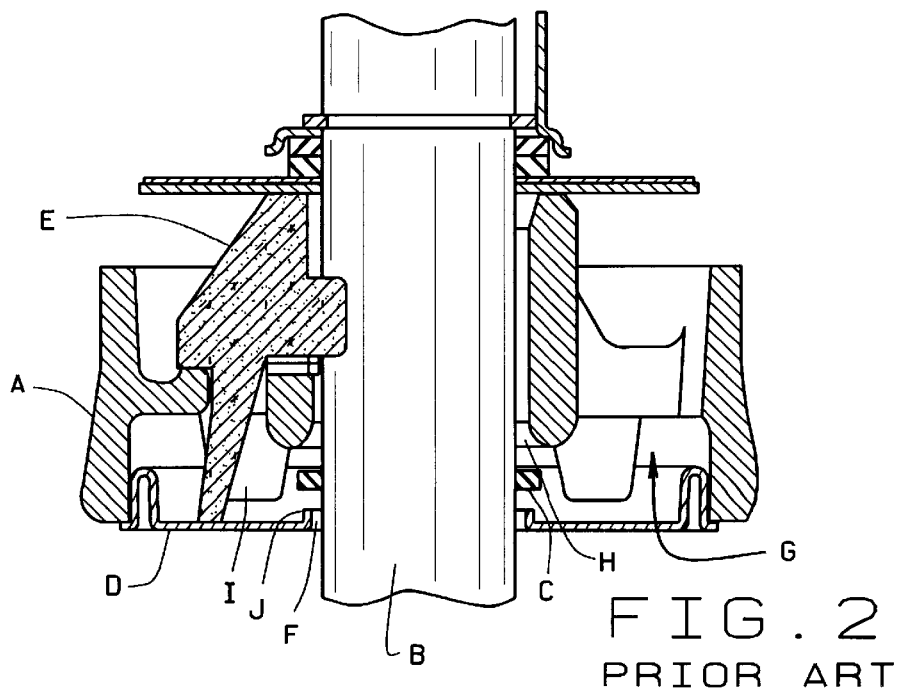
FIG. 2 is a cross-sectional elevation view of the electric motor of FIG. 1 after assembly.
Figure 7:
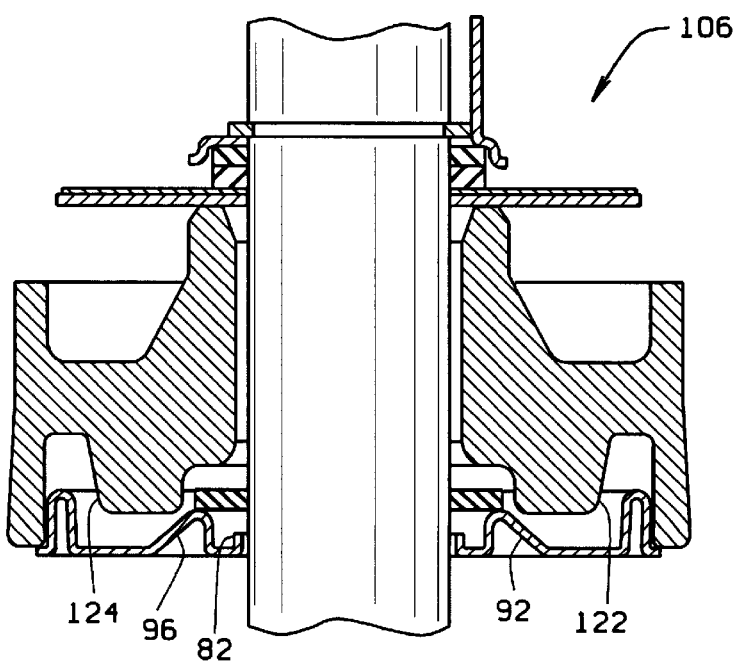
FIG. 7 is a cross-sectional elevation view taken through the centering tabs of the electric motor of FIG. 6.

FIG. 6 also illustrates the felt wick 114 that contacts the cap surface 88 while maintaining positive clearance with any of the protuberances 92–98. Similarly, FIG. 7 illustrates the positive clearance that exists between the protuberances 92, 96 and centering tabs 122, 124 provided on the end shield 116. To ensure this clearance is always attained, regardless of the bearing cap's rotational orientation, the height of the centering tabs 122, 124 have been reduced as compared to those of the prior art end shield shown in FIG. 2. The outer diameter of the rubber washer 112 is also greater than that of the prior art rubber washer shown in FIG. 2 to ensure the rubber washer 112 can only contact the protuberances 92–98, rather than the bearing cap's inner rim 82.

There are various changes and modifications which may be made to the invention as will be apparent to those skilled in the art. For example, the bearing cap's inner rim can be eliminated, and the cap surface can be inclined to form an annular oil reservoir that surrounds the bearing cap opening, with the protuberances extending beyond the plane in which the bearing cap opening lies so as to prevent the motor washer from contacting the inner edge that defines the opening, and thus prevent the washer from inducing an oil pumping action. However, these changes or modifications are included within the teaching of this disclosure, and it is intended that the invention be limited only by the scope of the claims appended hereto, and their equivalents.

What is claimed is:

1. In an electric motor used in shaft-across and shaft-down applications, the motor in shaft-across applications comprising a housing having an opening surrounded by an inner rim that projects towards an interior side of the housing and a shaft extending through the opening from the interior side of the housing to an exterior side of the housing; and comprising in shaft-down applications the housing having the opening surrounded by the inner rim that projects towards the interior side of the housing and the shaft extending through the opening from the interior side of the housing to the exterior side of the housing with a washer mounted on the shaft for rotation therewith on the interior side of the housing, an improvement comprising:

a protuberance supported by the housing adjacent the inner rim where the protuberance will prevent the washer from contacting the inner rim.

2. The electric motor of claim 1, wherein:

the protuberance is one of a plurality of protuberances that are spatially arranged around the inner rim.

3. The electric motor of claim 1, wherein:

the inner rim has a cylindrical surface that projects toward the interior side of the housing.

4. The electric motor of claim 1, wherein:

a bearing cap is supported by the housing and the inner rim and the protuberance are on the bearing cap.

5. The electric motor of claim 4, wherein:

the protuberance is one of a plurality of protuberances that are spatially arranged around the inner rim.

6. The electric motor of claim 4, wherein:

the bearing cap has an outer edge and a cap surface extending between the inner rim and the outer edge and the inner rim projects a first distance inwardly from the cap surface toward the interior side of the housing and the protuberance projects a second distance from the cap surface inwardly toward the interior side of the housing that is greater than the first distance.

7. The electric motor of claim 6, wherein:

the protuberance is one of a plurality of protuberances spatially arranged around the inner rim.

8. An electrical motor comprising a housing, a motor shaft, and a washer mounted on the shaft for rotation therewith, the house supporting an inner rim that projects towards an interior side of the housing and that surrounds an opening through which the motor shaft extends from the interior side of the housing to an exterior side of the housing, the washer extending around the motor shaft on the interior side of the housing, the housing being configured to prevent the washer from contacting the inner rim when the motor shaft is rotating.

9. The electric motor of claim 8 wherein the housing supports at least one protuberance extending into the interior side of the housing a distance greater than the inner rim.

10. The electric motor of claim 9 wherein the housing includes an end shield having at least one opening extending therethrough, the motor shaft extends through the end shield opening, and the end shield supports the protuberance.

11. The electric motor of claim 10 wherein the housing further includes a bearing cap attached to the end shield, and the bearing cap comprises the inner rim, the opening defined by the inner rim, and the protuberance.

12. The electric motor of claim 11 wherein the bearing cap comprises a plurality of protuberances.

13. The electric motor of claim 11 wherein the end shield includes a plurality of centering tabs, and each centering tab is dimensioned to maintain positive clearance with the bearing cap protuberance.

14. The electric motor of claim 11 wherein the bearing cap further comprises a reservoir for catching oil that travels through the end shield.

15. The electric motor of claim 14 further comprising a wick for removing oil from the bearing cap reservoir, the wick being positioned to maintain positive clearance with the bearing cap protuberance.

16. The electric motor of claim 8 wherein the motor shaft extends downwardly from the interior side of the housing, through the opening defined by the inner rim, to the exterior side of the housing.

17. A method for inhibiting oil leakage from an electric motor, the electric motor including a housing having an inner rim that projects towards an interior side of the housing and that surrounds an opening, a motor shaft extending through the opening, and a washer mounted on the motor shaft for rotation therewith, the method comprising the step of preventing the washer from moving into contact with the inner rim when the motor shaft is rotating.

18. The method of claim 17 wherein the preventing step includes forming at least one protuberance on the housing with the protuberance extending into the electric motor a distance greater than the inner rim.

19. The method of claim 18 wherein the forming step includes forming a plurality of protuberances.

20. The method of claim 18 wherein the housing includes a bearing cap and the forming step includes forming the protuberance on the bearing cap.

* * * * *